SHIP'S PROPELLER MOUNTINGS

Filed Oct. 28, 1966 2 Sheets-Sheet 1

United States Patent Office 3,358,772

Patented Dec. 19, 1967

1

3,358,772

SHIP'S PROPELLER MOUNTINGS

Thomas Walter Bunyan, London, England, assignor to P & O Research and Development Co. Limited, London, England Filed Oct. 28, 1966, Ser. No. 590,398

Claims priority, application Great Britain, Nov. 8, 1965, 47,257/65; Jan. 11, 1966, 1,191/66

5 Claims. (Cl. 170—173)

ABSTRACT OF THE DISCLOSURE

A ship's propeller and propeller shaft assembly in which an internally and externally tapered sleeve is a forced-up fit on the taper end of the propeller shaft and a propeller with a hub internally tapered at its rear end is a forced-up fit on the rear end of the sleeve, whilst a clearance space exists between the forward end part of the hub and the part of the sleeve surrounded by it and the forward end of the sleeve extends beyond the hub so as to be able to form part of a journal bearing for the propeller shaft in the stern post of the ship Hydraulic jacking arrangements making use of annular pistons in association with pressure fluid-expandable ring-tubes are provided for the fitting of the forced-up fitting parts and their separation.

Figure 1:
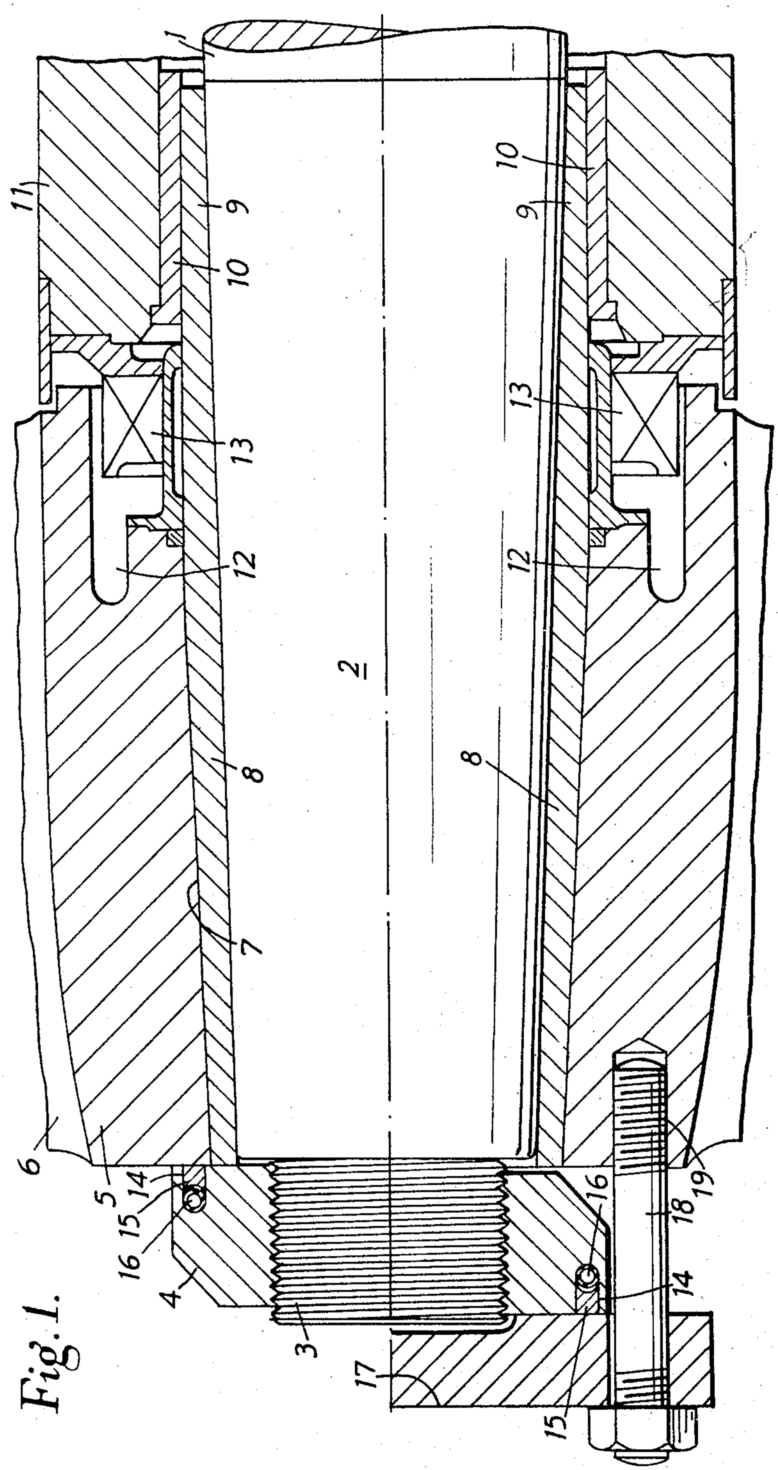

The present invention relates to improvements in or developments of the ship's propeller and taper-ended propeller shaft assembly forming the subject of earlier Patent No. 3,228,482.

The assembly forming the subject of earlier Patent No. 3,228,482 includes a metal sleeve disposed between the circumferential surface of the tapered portion of the propeller shaft and the interior of the hub of the propeller, said sleeve being in torque and thrust transmitting connection with the propeller shaft, and the hub of the propeller being in driven connection with the sleeve at or in the region of the end of the sleeve nearest the rearward smaller end of the tapered portion of the shaft and an annular clearance space being provided at the other end between the sleeve and hub and extending from the end of the hub adjacent the larger forward end of the tapered portion of the shaft over a part of the axial length of the hub.

It is an object of the present invention to provide an improved arrangement of the kind referred to above, offering reduction of the bending stress in the tail shaft and an increase in fatigue resistance.

In accordance with the present invention a ship's propeller and propeller shaft assembly as described above is provided wherein the sleeve is of a form to provide a tubular extension forward of the forward end of the propeller hub with said extension in surface engagement with the propeller shaft, so as to be capable of extending into the stern post of the ship to form a journal within the rearmost bearing of the propeller shaft.

The bore in the sleeve is tapered to correspond with the taper of the end of the shaft and the torque and thrust transmitting connection between the sleeve and shaft is obtained by shrink or endwise force-fitting the sleeve on the tapered portion of the shaft.

The connection between the rearward end part of the propeller hub and the sleeve may be carried out by fitting and fixing the sleeve within the hub or by casting-in the sleeve during casting of the propeller while providing the required annular clearance space between the forward end part of the hub and the sleeve, or again the sleeve may be externally tapered and the interior of the rearward end part of the hub correspondingly tapered and the hub force-fitted endwise on to the sleeve.

2

The last force-fitting procedure is at present preferred and the sleeve may be forced-fitted first to the taper end of the propeller shaft and the propeller hub thereafter force-fitted to the sleeve on the shaft after the latter is installed in a ship, or the sleeve may be first force-fitted in the hub of the propeller and the sleeve and propeller assembly finally force-fitted to the taper end of the propeller shaft. These force-fitting procedures make for good stress distribution or low stress concentration. For example, when the propeller hub is force-fitted on to a sleeve already force fitted on to the shaft, the initial tensile loop stress in the sleeve is reduced due to the compressive loop stress applied to the sleeve by the propeller hub. Similarly, when the sleeve is first force-fitted into the hub, the initial compressive stress in the sleeve is reduced by the tensile stress induced when the sleeve and hub are force fitted to the shaft.

Advantages of the arrangement may be summarised as follows:

(a) The combined stress at the most critical point, i.e. at the forward end of the propeller hub is a minimum.

(b) The diffusion of stress from the shaft into the sleeve and from the sleeve to the hub is such as to reduce local stress concentration effects significantly, as has been established by detailed fatigue tests.

(c) The level of the bending stress in the shaft in the critical region adjacent the leading end of the hub is reduced to as little as 30% of what is to be expected with hiterto conventional methods in which a taper-bored propeller hub is force-fitted directly on to a tapered propeller shaft.

The invention also includes means for applying endwise pressure to the sleeve or to the hub of the propeller for the purpose of effecting the force-fitting of the sleeve on the shaft or the hub on the already applied sleeve, and for the purpose of removing the force-fitted members from the shaft.

Figure 2:
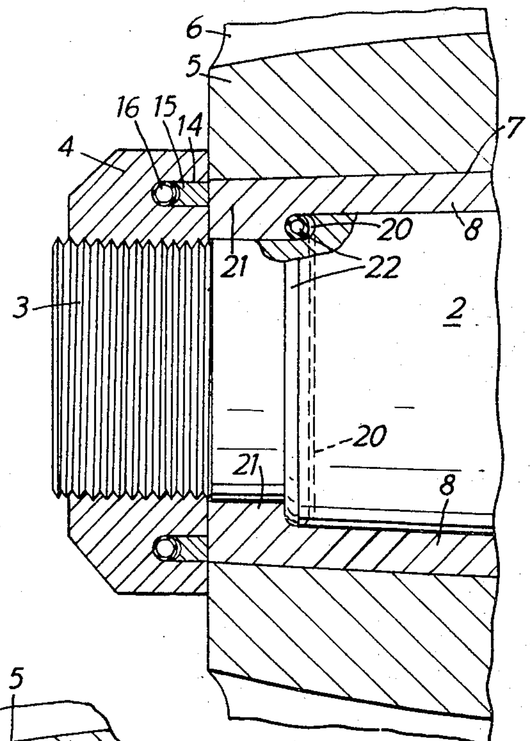
Figure 3:
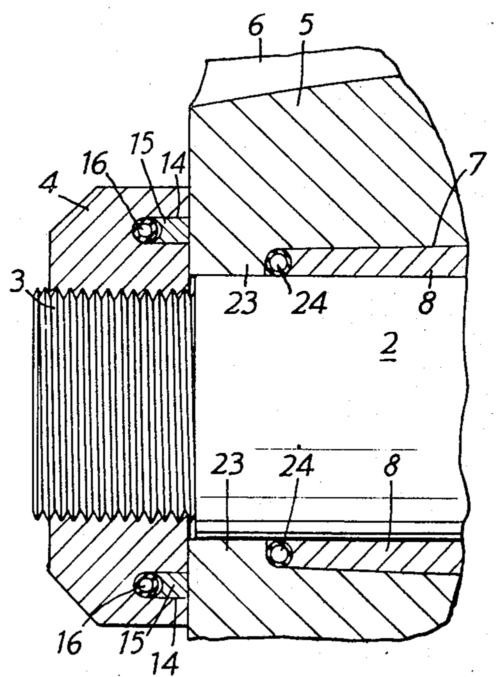

The invention is illustrated by way of example in the accompanying drawings, FIG. 1 showing in sectional elevation an assembly of a part of a ship's propeller and the tapered end of a propeller shaft and one arrangement for separating force-taper fitted parts of the assembly from one another, and FIGS. 2 and 3 each show in sectional elevation a part of an assembly as shown in FIG. 1 with alternative arrangements for separating force-taper fitted parts thereof.

Referring to the drawing, 1 represents a propeller tail-shaft extending through the stern post 11 of the vessel, the outwardly extending portion 2 being of decreasing diameter or tapered towards the rear end, i.e. towards the left in the drawing and the rearward extremity being reduced as shown at 3 and threaded to receive a propeller securing nut 4.

The hub 5 of the propeller 6, usually of bronze alloy, is internally tapered, e.g. taper-bored with the bore 7 decreasing in diameter towards the rear end, and in this tapered bore 7 in the hub 5 is fitted a sleeve 8 of s.g. (spheroidal graphite) iron, steel or other metal having a co-efficient of expansion approximating to that of steel, i.e. the metal of the shaft 1, and of an axial length in excess of the axial length of the hub, the excess length of the sleeve 8 extending at least for the major part at the forward end of the hub as shown at 9.

The connection of the sleeve 8 in the bore in the hub 5 is a torque and thrust transmitting connection and in the case shown is achieved by endwise forcing or by shrink fitting.

As an alternative however the sleeve 8 may be pre-formed and fitted or cast-in during the casting of the propeller itself.

The interior of the sleeve is of decreasing diameter towards the rear end to correspond with the taper of the tapered part 2 of the tailshaft 1 and the sleeve 8 and propeller assembly are forced up by the nut 4 to provide a torque and thrust transmitting force fit of the sleeve 8 on the tailshaft 1.

Alternatively however the sleeve 8 may be first force-fitted onto the tapered part 2 of the shaft 1 and the hub 5 of the propeller applied subsequently over and force-fitted to the sleeve.

The end portion 9 of the sleeve 8 extending forwardly beyond the inner end of the propeller hub 5 surrounds and fits the tailshaft 1 and constitutes a journal rotatable in the rear end propeller shaft bearing 10 supported in the stern post 11 of the vessel and thus serving to carry the overhung weight of the propeller and a part of the weight of the tailshaft.

The annular clearance space between the forward part of the hub 5 and the sleeve 8 is formed by a circumferential recess 12 extending into the hub from its forward end, so that the zone of connecting driving engagement between the hub 5 and the sleeve 8 is limited to correspond to a part only of the axial length of the hub at the rearward end thereof. The space within the recess 12 may be utilised to accommodate at least the greater part of an oil retaining gland assembly 13 as usually employed at the point of exit of a tailshaft from a stern post, thus making possible a further reduction in the overhung mass moment of the propeller as compared with hitherto orthodox forms of propeller mounting.

The means for exerting the endwise force for force-fitting the sleeve 8 or the pre-assembled sleeve 8 and hub 5 on the shaft, or the hub 5 on to a sleeve 8 already force-fitted to the shaft may be associated with the propeller securing nut 4 screwed on the reduced end part 3 of the shaft.

For this purpose the nut 4 is provided with an annular recess 14 in its inner face, containing an annular piston-like element 15 fitting and capable of sliding in the recess 14, and a rubber or like expansible ring-tube 16 filling the space between the bottom of the recess 14 and the piston element 14.

In the upper half of FIG. 1 the nut 4 is shown as arranged for force-fitting a pre-assembled combination of sleeve 8 and propeller hub 5.

The nut 4 is screwed on to the reduced end 3 of the shaft until it engages the rear end face of the hub 5 in which position the piston element contacts the end face of the hub. A fluid medium is now introduced under high pressure through an inlet (not shown) to the ring-tube 16 to expand the latter to move the piston element 14 axially in the recess 14 so that the hub 5 with the sleeve 8 therein is forced up on the tapered part 2 of the shaft. With the required degree of force fit achieved, the pressure in the ring-tube 16 and on the piston element 14 is relieved and the nut 4 screwed up tight against the sleeve and hub.

The same nut 4 can be made use of to break the force fit connection between the sleeve and hub or the sleeve and hub combination and the tapered shaft. For this purpose the nut 4 is unscrewed from reduced part 3 of the shaft, reversed and screwed on again but without contacting the part to be withdrawn, e.g. the sleeve 8 or the hub 5 in the manner shown in the lower half of FIG. 1.

A stiff plate 17 is mounted in a fixed position, by means of a number of studs 18 screwed into threaded holes 19 in the rear end of the hub, for engagement by the outer face of the piston-like element 15. Upon application of fluid pressure in the ring-tube 16 the plate 17 is thrust outwards away from the nut 4 and the hub or hub and sleeve combination withdrawn along the tapered end of the shaft as required.

An alternative arrangement for freeing the force-fit of a hub and sleeve combination or a sleeve, force-fitted to the shaft is shown in FIG. 2.

In this case a chamber 20 is formed between the shoulder at the junction of the reduced end portion 3 with the tapered portion 2 of the shaft and an internal annular flange 21 in the rear end of the sleeve 8. In this chamber 20 is fitted an expansible ring-tube 22 which can be expanded by the introduction of a high pressure fluid medium through a suitable inlet (not shown). Expansion of the ring-tube 22 takes effect upon the internal annular flange 21 to move the sleeve 8 along the tapered part of the shaft in the direction to break the force-fit thereof on the shaft.

In FIG. 3 is shown an arrangement for breaking the force-fit between a hub 5 and a sleeve 8 suitable, for example, in cases where the sleeve has been first force-fitted to the shaft, and the hub force-fitted to the sleeve subsequently.

In this case the sleeve 8 is of a length such that its rear end terminates at a short distance from the junction of the reduced rear end part 3 of the shaft with the tapered part 2 thereof, and the rear end of the hub 5 is formed with an internal flange 23 which is a sliding fit about the end of part 2 of the shaft and spaced from the rear end of the sleeve 8 so that a chamber is formed between the flange 23 and the rear end of the sleeve 8.

An expansible ring-tube 24 is fitted in this chamber and again, by the introduction of a fluid pressure medium into the ring-tube the tube can be expanded, and in this case pressure takes effect to move the internal flange 23, and therefore the hub 5, longitudinally relative to the sleeve 8 in the direction to break the force fit between the hub 5 and sleeve 8.

I claim:

1. A propeller mounting comprising:

a shaft having a tapered end, a metal sleeve element tapered internally and over at least a rear part externally, both tapers decreasing in diameter towards the rearward end, the internal taper corresponding to that of the tapered end of the shaft and the said metal sleeve element being force-taper fitted on the shaft, a propeller including a hub internally tapered at its rearward end and force-taper fitted on a circumferential zone on the externally tapered rear end part of the metal sleeve element of an axial length corresponding to a part only of the axial length of the hub, and with an axially elongated annular clearance space between a part of the said metal sleeve element forward of and adjacent said circumferential zone and the part of the hub surrounding said part of the metal sleeve element forward of and adjacent said circumferential zone, said clearance space extending from said circumferential zone through the forward end of the hub, and a further part of said metal sleeve element on the shaft extending forwards beyond the end of the hub surrounding said clearance space to extend through the stern post of a ship and form a journal in the rearmost bearing of the propeller shaft.

2. A propeller mounting as claimed in claim 1 and including:

a securing nut on the smaller end of the tapered shaft and an annular piston element fitting and movable axially of the securing nut in an annular recess in one face of the securing nut, with the piston element in engagement with the rearward end of the said metal sleeve member and the hub on the propeller shaft, an expansible ring-tube between the bottom of the recess in said nut and the piston element and means for introducing a pressure fluid into said ring-tube to expand said ring-tube to move said piston element into pressure engagement with the metal sleeve member and the hub to effect the force-taper fit thereof on the tapered shaft.

3. A propeller mounting including:

a shaft having a tapered end, a metal sleeve element tapered internally and over at least a part adjacent its rearward end externally, both tapers decreasing in diameter towards the rearward end, said metal sleeve element being a taper fit on the tapered end of the shaft, a propeller including a hub internally tapered at its rearward end and a taper fit on the tapered rear end portion of the metal sleeve element, a securing nut on the smaller end of the tapered shaft and an annular piston element fitting and movable axially of the nut in an annular recess in one face of the nut, with the free end of the piston element in engagement with the rear end of the said metal sleeve element and the hub, an expansible ring-tube between the bottom of the annular recess in the nut and the annular piston element and means for introducing a pressure fluid into said ring-tube to expand said ring-tube to move said piston element in the said annular recess and into pressure engagement with the rear end of said metal sleeve element and the hub to effect a force-taper fit thereof on to the tapered end of the shaft, a plate, and means for attaching said plate in a position in which it is fixed to and spaced from the rearward end of the force-taper fitted hub on the tapered end of the shaft, whereby with the said securing nut reversed in position on the rearward end of the tapered shaft the said piston element engaged with said plate and introduction of pressure fluid into said expansible ring-tube, pressure is applied by the piston element to the plate to move it axially away from the shaft to draw the hub from its force-taper fitted connection with the shaft.

4. A propeller mounting including:

a shaft having a tapered end, a metal sleeve element tapered internally and over at least a part adjacent its rearward end externally, both tapers decreasing in diameter towards the rearward end, said metal sleeve element being a taper fit on the tapered end of the shaft, a propeller including a hub internally tapered at its rearward end and a taper fit on the tapered rear end portion of the metal sleeve element, a securing nut on the smaller end of the tapered shaft and an annular piston element fitting and movable axially of the nut in an annular recess in one face of the nut, with the free end of the piston element in engagement with the rear end of the said metal sleeve element and the hub, an expansible ring-tube between the bottom of the annular recess in the nut and the annular piston element and means for introducing a pressure fluid into said ring-tube to expand said ring-tube to move said piston element in the said annular recess and into pressure engagement with the rear end of said metal sleeve element and the hub to effect a force-taper fit thereof on to the tapered end of the shaft, a circumferential shoulder on the tapered shaft near to but spaced from the smaller end thereof and an internal flange in the rearward end of the metal sleeve element which is a sliding fit about the shaft between the said shoulder thereon and the smaller end of the shaft, a further expansible annular ring-tube located about the shaft between said circumferential shoulder on the shaft and said internal flange on the metal sleeve element, and means for introducing a fluid pressure medium into said further expansible annular ring-tube so that with the said securing nut removed the said annular ring-tube is expanded to move the said flange by reaction against the said shoulder to move the metal sleeve element axially and withdraw it from the force-taper fitted engagement with the tapered end of the shaft.

5. A propeller mounting including:

a shaft having a tapered end, a metal sleeve element tapered internally and over at least a part adjacent to its rearward end externally, both tapers decreasing in diameter towards the rearward end, said metal sleeve element being a taper fit on the tapered end of the shaft with its rearward end terminating a short distance from the small end of the tapered end of the shaft, a propeller including a hub having an internal flange in its rearward end and internally tapered over a part adjacent said internal flange with said internally tapered part a taper fit on the tapered rear end portion of the metal sleeve element, and the internal flange a sliding fit about the shaft between the end of the metal sleeve element and the smaller end of the shaft, a securing nut on the smaller end of the tapered shaft and an annular piston element fitting and movable axially of the nut in an annular recess in one face of the nut with the free end of the piston element in engagement with the rear end of the said metal sleeve element and the hub, an expansible ring-tube between the bottom of the annular recess in the nut and the annular piston element and means for introducing a pressure fluid into said ring-tube to move said piston element in the said annular recess and into pressure engagement with the rear end of the hub to effect a force-taper fit of the hub and metal sleeve element on the tapered end of the shaft, and a further expansible annular ring-tube located about the shaft between the internal flange in the reaward end of the hub and the rearward end of the metal sleeve element, and means for introducing a fluid pressure medium into said further expansible annular ring-tube so that with the said securing nut removed the said further annular ring-tube is expanded to move the said internal flange by reaction against the rearward end of the metal sleeve element to move the hub axially and withdraw it from the force-taper fitted engagement with the externally tapered part of the metal sleeve element.

References Cited

UNITED STATES PATENTS

| | | | |
|---|---|---|---|
| 2,571,265 | 10/1951 | Leufren. | |
| 3,097,003 | 7/1963 | Deve et al. | |
| 3,228,482 | 1/1966 | Bunyan | 170—173 |

FOREIGN PATENTS

| | | |
|---|---|---|
| 760 | 6/1926 | Australia. |
| 726,990 | 3/1932 | France. |
| 1,388,233 | 12/1964 | France. |
| 744,994 | 2/1956 | Great Britain. |

EVERETTE A. POWELL, Jr., *Primary Examiner.*